(12) United States Patent
Murata et al.

(10) Patent No.: US 11,328,138 B2
(45) Date of Patent: May 10, 2022

(54) INFORMATION COLLECTION SYSTEM AND INFORMATION COLLECTION TERMINAL

(71) Applicant: Alps Alpine Co., Ltd., Tokyo (JP)

(72) Inventors: Shinji Murata, Miyagi (JP); Hideki Masudaya, Miyagi (JP)

(73) Assignee: Alps Alpine Co., Ltd.

(*) Notice: Subject to any disclaimer, the term of this patent is extended or adjusted under 35 U.S.C. 154(b) by 0 days.

(21) Appl. No.: 17/179,504

(22) Filed: Feb. 19, 2021

(65) Prior Publication Data

US 2021/0174038 A1    Jun. 10, 2021

Related U.S. Application Data

(63) Continuation of application No. PCT/JP2019/007135, filed on Feb. 25, 2019.

(30) Foreign Application Priority Data

Sep. 14, 2018  (JP) .............................. JP2018-172509

(51) Int. Cl.
  *G06K 7/10*    (2006.01)
  *H04W 4/38*    (2018.01)
  (Continued)

(52) U.S. Cl.
  CPC .......... *G06K 7/10475* (2013.01); *H04L 67/12* (2013.01); *H04W 4/38* (2018.02); *H04W 84/18* (2013.01)

(58) Field of Classification Search
  CPC .... G06K 7/10475; G08C 15/06; G08C 17/00; H04L 12/00; H04L 67/12; H04Q 9/00;
  (Continued)

(56) References Cited

U.S. PATENT DOCUMENTS

| 2016/0362137 A1 | 12/2016 | Taki et al. |
| 2019/0302248 A1 | 10/2019 | Koyama et al. |
| 2021/0174038 A1* | 6/2021 | Murata .................. H04W 4/38 |

FOREIGN PATENT DOCUMENTS

| JP | 2002-157279 A | 5/2002 |
| JP | 2017-004369 A | 1/2017 |

(Continued)

*Primary Examiner* — Quan Zhen Wang
*Assistant Examiner* — Rajsheed O Black-Childress
(74) *Attorney, Agent, or Firm* — Harness, Dickey & Pierce, P.L.C.

(57) ABSTRACT

An information collection system includes a sensor terminal group including first sensor terminals and second sensor terminals and an information collection terminal capable of wireless communication with the sensor terminals. The information collection terminal includes a transmission unit that transmits data requests to the sensor terminals and a receiving unit that executes processing of receiving measurement data from the first sensor terminals in a first period, executes processing of receiving reception requests from the second sensor terminals in a second period, and when the reception requests are given, executes processing of receiving measurement data from the second sensor terminals in a third period. The second sensor terminal includes a transmission unit that, when the data requests are given, and when the control unit determines to transmit the measurement data, transmits the reception requests in the second period and transmits the measurement data in the third period.

10 Claims, 8 Drawing Sheets

(51) Int. Cl.
*H04L 29/08* (2006.01)
*H04W 84/18* (2009.01)
*H04L 67/12* (2022.01)

(58) Field of Classification Search
CPC ....... H04W 4/38; H04W 72/00; H04W 74/00; H04W 84/18
See application file for complete search history.

(56) References Cited

FOREIGN PATENT DOCUMENTS

JP   2017-168075 A   9/2017
WO   2017-098971 A1  6/2017

\* cited by examiner

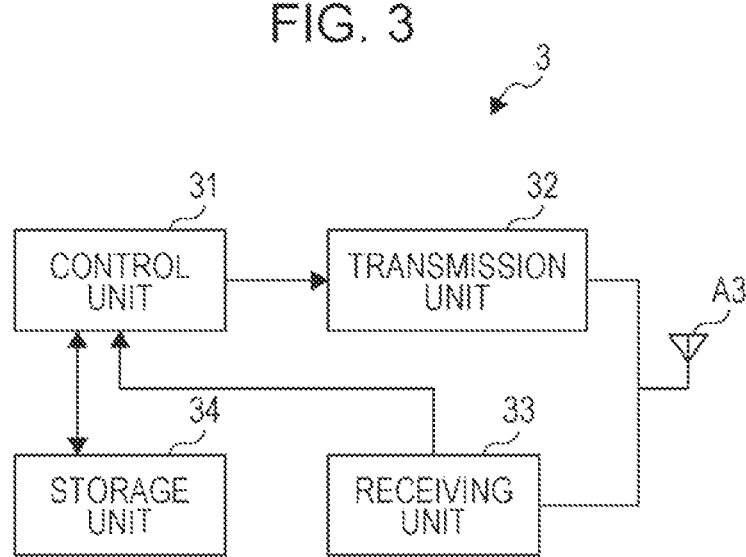

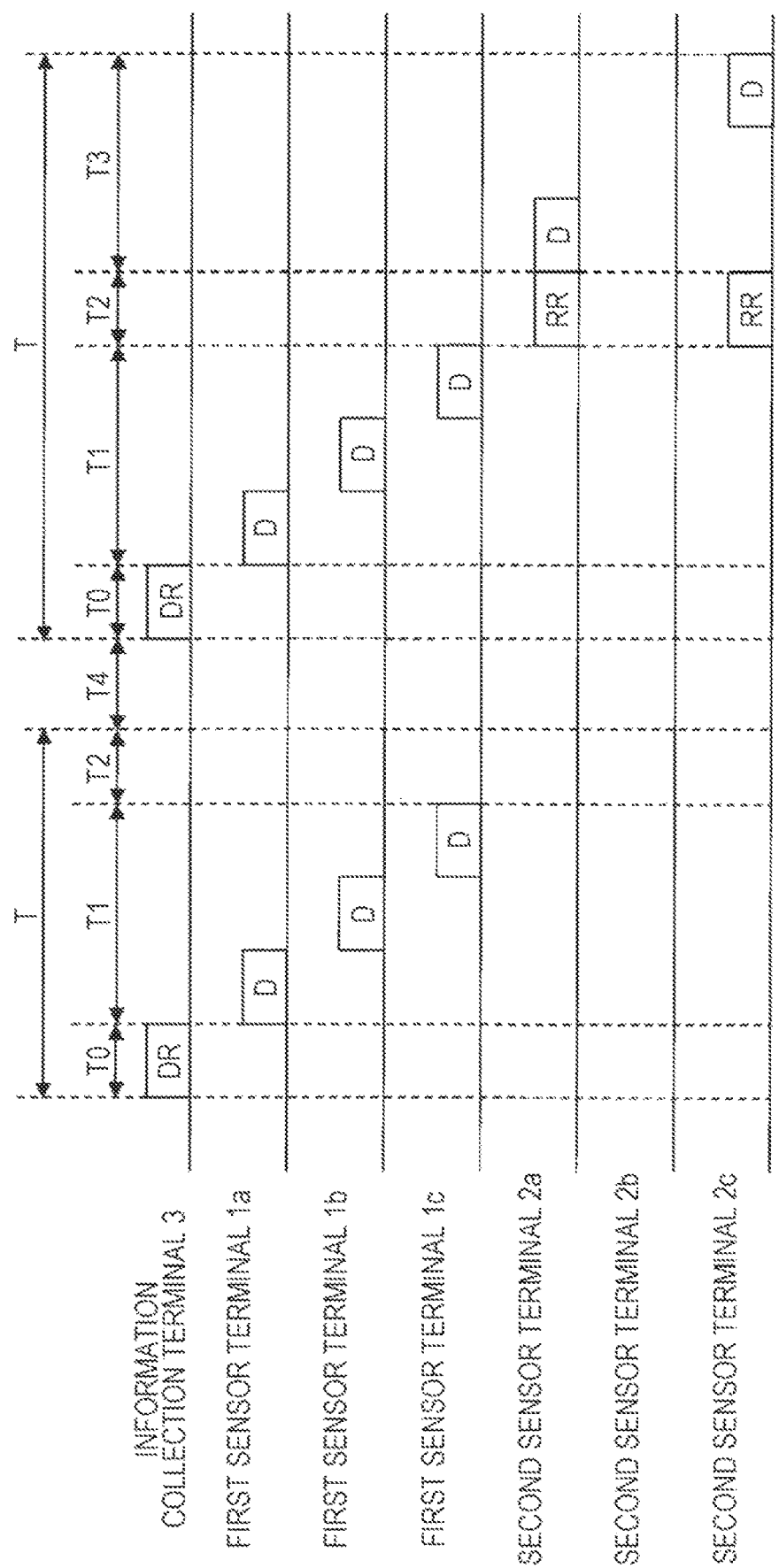

INFORMATION COLLECTION SYSTEM AND INFORMATION COLLECTION TERMINAL

CLAIM OF PRIORITY

This application is a Continuation of International Application No. PCT/JP2019/007135 filed on Feb. 25, 2019, which claims benefit of Japanese Patent Application No. 2018-172509 filed on Sep. 14, 2018. The entire contents of each application noted above are hereby incorporated by reference.

BACKGROUND OF THE INVENTION

1. Field of the Invention

The present invention relates to an information collection system and an information collection terminal.

2. Description of the Related Art

There is a known information collection system in the related art which includes a plurality of sensor terminals and an information collection terminal that wirelessly collects measurement data obtained by the plurality of sensor terminals. In the information collection system, each sensor terminal transmits measurement data in a predetermined order, and the information collection terminal receives the measurement data transmitted in order. The time required for the information collection terminal to collect the measurement data from all the sensor terminals is N×t seconds, where N is the number of sensor terminals included in the information collection system, and t is the time required for processing of receiving the measurement data from one sensor terminal. The cycle of collecting measurement data from each sensor terminal is N×t seconds or more in consideration of the time required for processing other than reception processing. In other words, the measurement data collection cycle increases according to the number of sensor terminals.

The plurality of sensor terminals sometimes include sensor terminals that have to collect the measurement data in a short collection cycle and sensor terminals that may collect the measurement data in a long cycle or only at specific timing. For example, when the information collection system is used for bridge beams, it is preferable to collect measurement data of strain sensors in a short collection cycle. In contrast, measurement data of earthquake sensors may be collected only when an earthquake occurs.

However, in the known information collection system, the collection cycle depends on the number of sensor terminals, as described above, and it is not possible to shorten the collection cycle of some sensor terminals. This causes a problem in that the measurement data collection cycle of sensor terminals that have to collect measurement data in a short cycle increases as the number of sensor terminals increases. A method for preferentially collecting measurement data from sensor terminals with a short collection cycle has been proposed. However, the method cannot shorten the collection cycle itself. The collection cycle of measurement data to be collected in a short cycle can be shorten by repeating that the system is reset after completion of collection of measurement data to be collected in a short cycle and the measurement data is collected again. However, this operation is complicated, and measurement data with a long collection cycle cannot be acquired at all during the operation.

SUMMARY OF THE INVENTION

The present invention provides an information collection system and an information collection terminal in which the collection cycle of measurement data from some sensor terminals can be short.

An information collection system according to an embodiment is an information collection system including a sensor terminal group including a plurality of first sensor terminals and a plurality of second sensor terminals and an information collection terminal capable of wireless communication with the sensor terminal group. The information collection terminal includes a transmission unit configured to transmit data requests to the sensor terminal group and a receiving unit configured, after the data requests are transmitted, to execute processing of receiving measurement data from the plurality of first sensor terminals in a first period, to execute processing of receiving reception requests from the plurality of second sensor terminals in a second period, and when the reception requests are given in the second period, to execute processing of receiving measurement data from the plurality of second sensor terminals in a third period. The first sensor terminal includes a sensor configured to obtain the measurement data and a transmission unit configured, when the data requests are given, to transmit the measurement data in the first period. The second sensor terminal includes a sensor configured to obtain the measurement data, a control unit configured to determine whether to transmit the measurement data, and a transmission unit configured, when the data requests are given, and when the control unit determines to transmit the measurement data, to transmit the reception requests in the second period and transmit the measurement data in the third period.

BRIEF DESCRIPTION OF THE DRAWINGS

FIG. 3 is a diagram showing an example of the hardware configuration of an information collection terminal;

FIG. 4 is a diagram showing an example of sensor terminals ID and the order thereof;

FIG. 5 is a timing chart showing an example of the operation of the information collection system;

DESCRIPTION OF THE PREFERRED EMBODIMENTS

Embodiments of the present invention will be described hereinbelow with reference to the attached drawings. Components with substantially the same functional configurations in the specification and the drawings according to the embodiments are given the same reference signs, and duplicated descriptions will be omitted.

An information collection system 100 according to an embodiment will be described with reference to FIGS. 1 to 10. The information collection system 100 according to this embodiment is a system for regularly collecting measurement data from multiple kinds of sensors disposed at multiple locations and includes a sensor terminal group including a plurality of sensor terminals and an information collection terminal that collects measurement data from the sensor terminal group by radio. The information collection system 100 is used in bridge beams, factories, vehicles, and so on.

Figure 1:
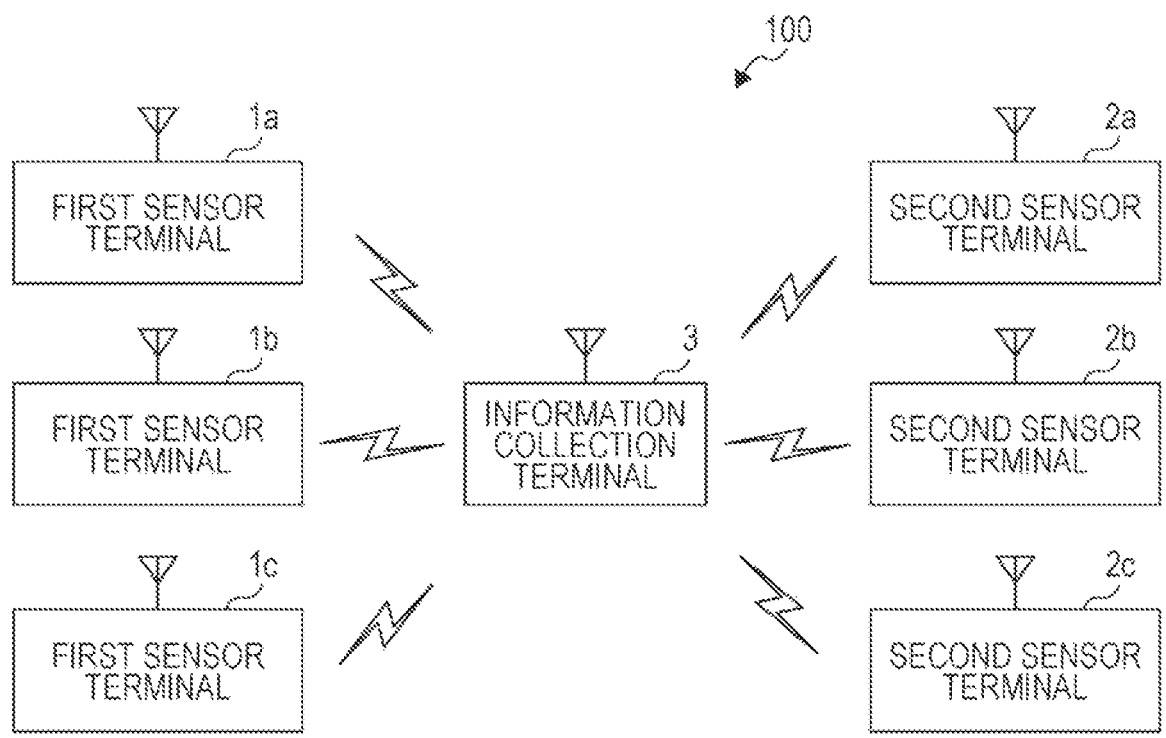
FIG. 1 is a diagram showing an example of an information collection system.

First, the schematic configuration of the information collection system 100 will be described. FIG. 1 is a diagram showing an example of the schematic configuration of the information collection system 100. The information collection system 100 of FIG. 1 includes first sensor terminals 1a to 1c, second sensor terminals 2a to 2c, and an information collection terminal 3. The first sensor terminals 1a to 1c and the second sensor terminals 2a to 2c correspond to a sensor terminal group. When the first sensor terminals 1a to 1c are not differentiated from one another, they are referred to as "first sensor terminal 1". Likewise, when the second sensor terminals 2a to 2c are not differentiated from one another, they are referred to as "second sensor terminal 2".

The first sensor terminal 1 is a sensor terminal capable of wireless communication with the information collection terminal 3 and is disposed at a position where the first sensor terminal 1 can communicate with the information collection terminal 3 by radio. The first sensor terminal 1 acquires measurement data D and transmits the measurement data D to the information collection terminal 3 by radio in a first time T1, described later. In the example of FIG. 1, the number of the first sensor terminals 1 in the information collection system 100 is three but may be any number equal to or greater than 2.

The second sensor terminal 2 is a sensor terminal capable of wireless communication with the information collection terminal 3 and is disposed at a position where the second sensor terminal 2 can communicate with the information collection terminal 3 by radio. The second sensor terminal 1 acquires measurement data D and transmits the measurement data D to the information collection terminal 3 by radio in a third time T3, described later. In the example of FIG. 1, the number of the second sensor terminals 2 in the information collection system 100 is three but may be any number equal to or greater than 2.

The first sensor terminal 1 and the second sensor terminal 2 are preferably radio frequency identifier (RFID) tags. Examples of the RFID tags include a passive tag having no battery, an active tag having a battery, and a semiactive tag having a battery and functioning as an active tag when detecting a specific signal. In particular, the first sensor terminal 1 and the second sensor terminal 2 are preferably passive tags that are driven by electric power received by radio from the information collection terminal 3. This eliminates the need for a battery, increasing the available period of the first sensor terminal 1 and the second sensor terminal 2.

The information collection terminal 3 is an information collection terminal capable of communicating with a sensor terminal group including the first sensor terminal 1 and the second sensor terminal 2 by radio. The information collection terminal 3 collects the measurement data D by radio from the first sensor terminal 1 and the second sensor terminal 2. Specifically, the information collection terminal 3 executes reception processing for receiving the measurement data D from the first sensor terminal 1 in the first time T1 and executes reception processing for receiving the measurement data D from the second sensor terminal 2 in the third time T3. The details of a method for collecting the measurement data D will be described later. An example of the information collection terminal 3 is, but not limited to, a RFID reader. The information collection terminal 3 may be any device that can communicate with the first sensor terminal 1 and the second sensor terminal 2 by radio.

Figure 2:
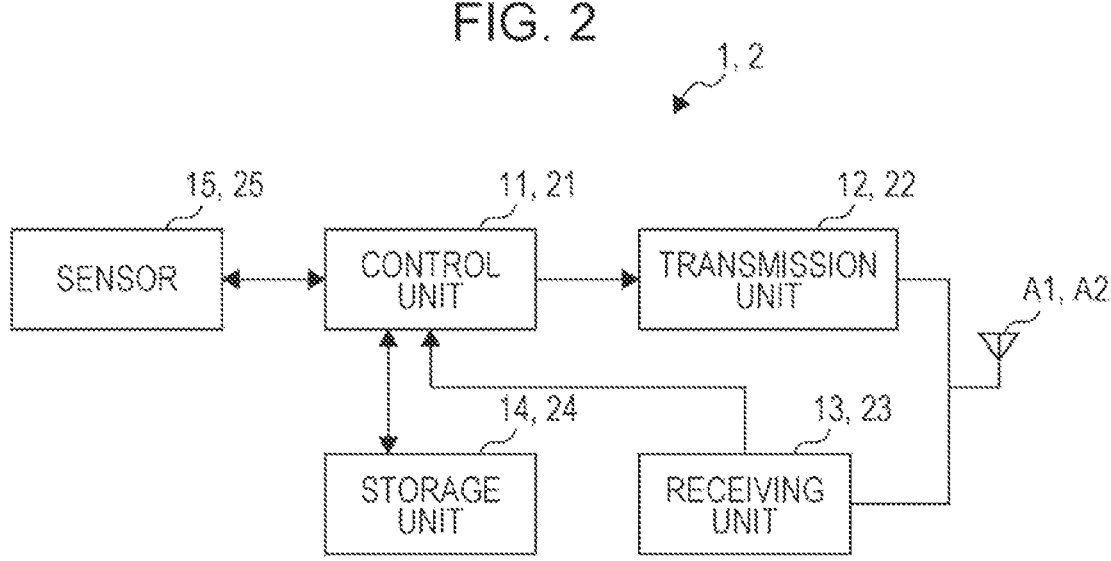
FIG. 2 is a diagram showing an example of the hardware configuration of a first sensor terminal and a second sensor terminal.

Next, the hardware configurations of the first sensor terminal 1, the second sensor terminal 2, and the information collection terminal 3 will be described. FIG. 2 is a diagram showing an example of the hardware configuration of the first sensor terminal 1 and the second sensor terminal 2.

The first sensor terminal 1 in FIG. 2 includes a control unit 11, a transmission unit 12, a receiving unit 13, a storage unit 14, a sensor 15, and an antenna A1.

The control unit 11 is a control circuit that controls the entire first sensor terminal 1 by executing programs. An example of the control unit 11 is, but not limited to, a central processing unit (CPU).

The transmission unit 12 is a transmission circuit that executes predetermined processing, such as amplification or modulation, on a signal (data) input from the control unit 11 to transmit the signal by radio. The transmission unit 12 inputs the signal subjected to the predetermined processing to the antenna A1.

The receiving unit 13 is a reception circuit that executes predetermined processing, such as amplification and modulation, on an electrical signal input from the antenna A1. The receiving unit 13 inputs the signal subjected to the predetermined processing to the control unit 11.

The storage unit 14 is a non-volatile memory that stores programs that the control unit 11 executes and various kinds of data. The storage unit 14 stores the identification information (sensor terminal ID) of the first sensor terminal and the identification information (information collection terminal ID) of the information collection terminal 3. In the first sensor terminal 1, the order in which the first sensor terminal 1 of the plurality of first sensor terminals 1 transmits the measurement data D is set in advance, and the order is stored in the storage unit 14. When the sensor terminal group includes three first sensor terminals 1 as in the example of FIG. 1, one of Nos. 1 to 3 is set to each first sensor terminal 1. The order set to each first sensor terminal 1 corresponds to the time after the first sensor terminal 1 receives a data request DR from the information collection terminal 3 until the first sensor terminal 1 transmits the measurement data D. The storage unit 14 of the first sensor terminal 1 may store different times (after the data request DR is received until the measurement data D is transmitted) so that each of the first sensor terminal 1 transmits the measurement data D first, second, and third. The storage unit 14 is, but not limited to, a flash memory.

The sensor 15 is a sensor that preferably collects the measurement data D in a short cycle. The sensor 15 acquires the measurement data D and inputs the measurement data D to the control unit 11. The sensor 15 is, but not limited to, a strain sensor, an acceleration sensor, or a load sensor. The first sensor terminal 1 may include a plurality of sensors 15.

The antenna A1 is an antenna for receiving and transmitting radio signals. In the example of FIG. 2, the antenna A1 is connected to the transmission unit 12 and the receiving unit 13. Alternatively, different antennas A1 may be connected to the transmission unit 12 and the receiving unit 13.

The control unit 11, the transmission unit 12, the receiving unit 13, and the storage unit 14 may be separately mounted on the same substrate, or may be mounted as a single large scale integration (LSI). The first sensor terminal 1 in this embodiment is a passive tag including a charging means, such as a capacitor, therein. The first sensor terminal 1 stores electric power of radio waves transmitted from the information collection terminal 3 and performs all operations of the first sensor terminal 1, such as acquisition, reception, and transmission of the measurement data D. Since the configuration of the passive tag is well known, the description of the details will be omitted.

Next, the second sensor terminal 2 will be described with reference to FIG. 2 because the basic configuration is the same as the configuration of the first sensor terminal 1. The second sensor terminal 2 includes a control unit 21, a transmission unit 22, a receiving unit 23, a storage unit 24, a sensor 25, and an antenna A2.

The control unit 21 is a control circuit that controls the entire second sensor terminal 2 by executing programs. An example of the control unit 21 is, but not limited to, a CPU.

The transmission unit 22 is a transmission circuit that executes predetermined processing, such as amplification or modulation, on a signal (data) input from the control unit 21 to transmit the signal by radio. The transmission unit 22 inputs the signal subjected to the predetermined processing to the antenna A2.

The receiving unit 23 is a reception circuit that executes predetermined processing, such as amplification or modulation, on an electrical signal input from the antenna A2. The receiving unit 23 inputs the signal subjected to the predetermined processing to the control unit 21.

The storage unit 24 is a non-volatile memory that stores programs that the control unit 21 executes and various kinds of data. The storage unit 24 stores the identification information (sensor terminal ID) of the second sensor terminal. In the second sensor terminal 2, the order in which the second sensor terminal 2 of the plurality of second sensor terminals 2 transmits the measurement data D is set in advance, and the order is stored in the storage unit 24. When the sensor terminal group includes three second sensor terminals 2 as in the example of FIG. 1, one of Nos. 1 to 3 is set to each second sensor terminal 2. The order set to each second sensor terminal 2 corresponds to the time after the second sensor terminal 2 receives a data request DR from the information collection terminal 3 until the second sensor terminal 2 transmits the measurement data D. The storage unit 24 of the second sensor terminal 2 may store different times (after the data request DR is received until the measurement data D is transmitted) so that each of the second sensor terminal 2 transmits the measurement data D first, second, and third. The time at which the second sensor terminal 2 transmits the measurement data D is set so as not to overlap with the time at which the first sensor terminal 1 transmits the measurement data D. The storage unit 24 is, but not limited to, a flash memory.

The sensor 25 is a sensor that may collect the measurement data D in a long cycle or only at a specified timing. The sensor 25 acquires the measurement data D and inputs the measurement data D to the control unit 21. The sensor 25 is, but not limited to, an earthquake sensor, a strong-wind sensor, a temperature sensor, or a humidity sensor. The second sensor terminal 2 may include a plurality of sensors 25.

The antenna A2 is an antenna for receiving and transmitting radio signals. In the example of FIG. 2, the antenna A2 is connected to the transmission unit 22 and the receiving unit 23. Alternatively, different antennas A2 may be connected to the transmission unit 22 and the receiving unit 23.

The control unit 21, the transmission unit 22, the receiving unit 23, and the storage unit 24 may be separately mounted on the same substrate, or may be mounted as a single LSI. The second sensor terminal 2 in this embodiment is a passive tag including a charging means, such as a capacitor, therein. The second sensor terminal 2 stores electric power of radio waves transmitted from the information collection terminal 3 and performs all operations of the second sensor terminal 2, such as acquisition, reception, and transmission of the measurement data D. Since the configuration of the passive tag is well known, the description of the details will be omitted. The difference between the first sensor terminal 1 and the second sensor terminal 2 is basically, the kinds of the sensors 15 and 25 and the details of the control of the control units 11 and 21. The difference in the details of the control between the first sensor terminal 1 and the second sensor terminal 2 will be described in detail hereinbelow.

FIG. 3 is a diagram showing an example of the hardware configuration of the information collection terminal 3. The information collection terminal 3 in FIG. 3 includes a control unit 31, a transmission unit 32, a receiving unit 33, a storage unit 34, and an antenna A3.

The control unit 31 is a control circuit that controls the entire information collection terminal 3 by executing programs. An example of the control unit 31 is, but not limited to, a CPU.

The transmission unit 32 is a transmission circuit that executes predetermined processing, such as amplification or modulation, on a signal (data) input from the control unit 31 to transmit the signal by radio. The transmission unit 32 inputs the signal subjected to the predetermined processing to the antenna A3.

The receiving unit 33 is a reception circuit that executes predetermined processing, such as amplification or modulation, on a signal input from the antenna A3. The receiving unit 33 inputs the signal subjected to the predetermined processing to the control unit 31.

The storage unit 34 is a non-volatile memory that stores programs that the control unit 31 executes and various kinds of data. The storage unit 34 stores the identification information (information collection terminal ID) of the information collection terminal 3. The storage unit 34 stores the sensor terminal IDs of the first sensor terminal 1 and the second sensor terminal 2 included in the sensor terminal group and the orders set to the first sensor terminal 1 and the second sensor terminal 2 in association with each other. The storage unit 34 is, but not limited to, a flash memory.

FIG. 4 is a diagram showing an example of the sensor terminal ID and the order thereof stored in the storage unit 34. In the example of FIG. 4, the sensor terminal ID "T11" of the first sensor terminal 1a and the order "1" are associated with each other, the sensor terminal ID "T12" of the first sensor terminal 1b and the order "2" are associated with each other, and the sensor terminal ID "T13" of the first sensor terminal 1c and the order "3" are associated with each other. The sensor terminal ID "T21" of the second sensor terminal 2a and the order "1" are associated with each other, the sensor terminal ID "T22" of the second sensor terminal 1b and the order "2" are associated with each other, and the sensor terminal ID "T23" of the second sensor terminal 1c and the order "3" are associated with each other. In this case, the storage unit 14 of the first sensor terminal 1*a* with the sensor terminal ID "T11" stores "1" as the order of the first sensor terminal 1*a*, and the first sensor terminal 1*a* transmits the measurement data D first among the plurality of first sensor terminals 1. Likewise, the storage unit 24 of the second sensor terminal 2*a* with the sensor terminal ID "T21" stores "1" as the order of the second sensor terminal 2*a*, and the second sensor terminal 2*a* transmits the measurement data D first among the plurality of second sensor terminals 2. Instead of the order, the storage units 14 and 24 may store the time corresponding to the order, as described above. In this case, the first sensor terminal 1 and the second sensor terminal 2 with the same order store different times.

The antenna A3 is an antenna for receiving and transmitting radio signals. In the example of FIG. 3, the antenna A3 is connected to the transmission unit 32 and the receiving unit 33. Alternatively, different antennas A3 may be connected to the transmission unit 32 and the receiving unit 33.

The control unit 31, the transmission unit 32, the receiving unit 33, and the storage unit 34 may be separately mounted on the same substrate, or may be mounted as a single LSI. The information collection terminal 3 preferably includes a communication means for transmitting the measurement data D from the first sensor terminal 1 and the second sensor terminal 2 to an external device by wire or by radio.

Next, the operation of the information collection system 100 will be described. In the following example, the first sensor terminal 1 and the second sensor terminal 2 are passive tags.

FIG. 5 is a timing chart showing an example of the operation of the information collection system 100. The information collection terminal 3 supplies electric power to the sensor terminal group by radio during an operation time T to make the sensor terminal group operable. Specifically, the information collection terminal 3 may make the sensor terminal group operable in response to a data request DR or by transmitting an unmodulated signal for supplying electric power at a predetermined timing separately (for example, before transmitting the data request DR), not on the data request DR. As shown in FIG. 5, the operation time T includes the zeroth time T0, the first time T1, and the second time T2, or the zeroth time T0, the first time T1, the second time T2, and the third time T3.

The zeroth time T0 is a period of time during which the information collection terminal 3 transmits the data request DR, which is a signal for requesting transmission of the measurement data D, to the sensor terminal group. The information collection terminal 3 transmits the data request DR without specifying the address. The data request DR is a modulated signal including an information collection terminal ID, such as amplitude shift keying (ASK) signal. The first sensor terminal 1 and the second sensor terminal 2 are made operable by the electric power received from the information collection terminal 3 in the zeroth time T0.

The first time T1 is a period of time in which the first sensor terminal 1 transmits the measurement data D by radio. When each first sensor terminal 1 receives the data request DR and confirms that the information collection terminal ID included in the data request DR is the information collection terminal ID stored in the storage unit 14, then the first sensor terminal 1 transmits the measurement data D according to the preset order (time) in the first time T1. The information collection terminal 3 executes processing for receiving the measurement data D from the first sensor terminal 1 In the first time T1. The second sensor terminal 2 determines whether to transmit the measurement data D of the second sensor terminal 2 to the information collection terminal 3 in the first time T1. A method for determination will be described later.

The second time T2 is a period of time in which the second sensor terminal 2, which has determined to transmit the measurement data D, transmits a reception request RR, by radio, that is a signal for requesting reception of the measurement data D to the information collection terminal 3. When the second sensor terminal 2 determines to transmit the measurement data D, the second sensor terminal 2 transmits the reception request RR in the second time T2, as the second sensor terminals 2*a* and 2*c* do, as shown in FIG. 5. When the second sensor terminal 2 determines not to transmit the measurement data D, the second sensor terminal 2 does not transmit the reception request RR, like the second sensor terminal 2*b* in FIG. 5. The information collection terminal 3 executes processing of receiving the reception request RR from the second sensor terminal 2 in the second time T2. The reception request RR does not include such data as the sensor terminal ID. When a signal with a predetermined intensity or higher is given, the information collection terminal 3 determines that the reception request RR is given. This allows the information collection terminal 3 to determine that the reception request RR is given even if reception requests RR from a plurality of second sensor terminals 2 are given at the same time.

The third time T3 is a period of time in which the second sensor terminal 2, which has determined to transmit the measurement data D, transmits the measurement data D by radio. When each second sensor terminal 2 determines to transmit the measurement data D, each second sensor terminal 2 transmits the measurement data D according to the preset order (time) in the third time T3, as the second sensor terminals 2*a* and 2*c* in FIG. 5 do. When the second sensor terminal 2 determines not to transmit the measurement data D, the second sensor terminal 2 does not transmit the measurement data D, like the second sensor terminal 2*b* in FIG. 5. The information collection terminal 3 executes processing of receiving the measurement data D from the second sensor terminal 2 in the third time T3.

As shown in FIG. 5, if the information collection terminal 3 does not receive any reception request RR in the second time T2, the information collection terminal 3 ends the operation. In this case, the operation time T does not include the third time T3, as the first operation time T in FIG. 5 shows. In contrast, if the information collection terminal 3 has received one or more reception requests RR in the second time T2, the information collection terminal 3 executes processing of receiving the measurement data D from the second sensor terminal 2. In this case, the operation time T includes the third time T3, as the second operation time T in FIG. 5 shows. The reception request RR corresponds to an interrupt signal for causing the information collection terminal 3 to execute processing of receiving the measurement data D from the second sensor terminal 2.

When the fourth time T4 has passed after the end of the operation time T, the information collection terminal 3 starts the next operation time T. Accordingly, the collection cycle of the measurement data D from the sensor terminal group is expressed as T+T4. In other words, when the information collection terminal 3 has not received any reception request RR in the second time T2, the collection cycle is T0+T1+T2+T4, and when the information collection terminal 3 has received one or more reception requests RR in the second time T2, the collection cycle is T0+T1+T2+T3+T4. The fourth time T4 may be 0. When the fourth time T4 is fixed, the data collection interval is fixed. However, the fourth time T4 does not necessarily have to be fixed.

Figure 6:
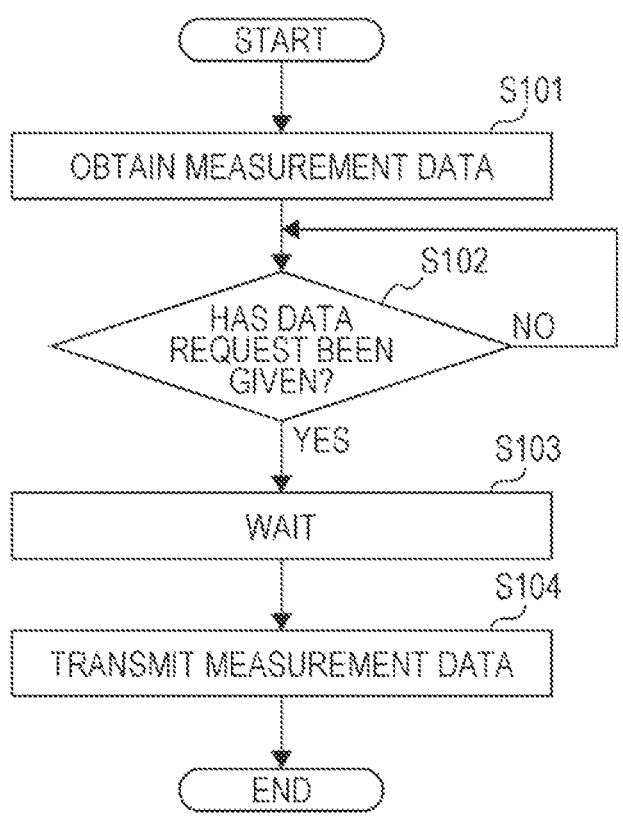
FIG. 6 is a flowchart showing an example of the operation of the first sensor terminal.

FIG. 6 is a flowchart showing an example of the operation of the first sensor terminal 1. The first sensor terminal 1 starts the operation of FIG. 6 when activated by receiving electric power from the information collection terminal 3.

When the first sensor terminal 1 is activated, the sensor 15 obtains measurement data D (step S101) and temporarily stores the measurement data D in the storage unit 14. Thereafter, the receiving unit 13 executes processing of receiving a data request DR from the information collection terminal 3 (step S102), as shown in FIG. 6. The receiving process includes processing for determining whether the received signal includes the information collection terminal ID stored in the storage unit 14. The receiving unit 13 continues the receiving process until receiving the data request DR (step S102: NO).

Upon receiving the data request DR from the information collection terminal 3 via the antenna A1 (step S102: YES), the receiving unit 13 inputs the data request DR to the control unit 11. When the data request DR is input, the control unit 11 reads the order stored in the storage unit 14 and waits until the time corresponding to the order in which the first sensor terminal 1 transmits the measurement data D, in other words, the time to transmit the measurement data D, comes (step S103). The transmission time corresponds to the data request DR reception time plus the time corresponding to the order.

When the measurement data D transmission time has come, the control unit 11 reads the measurement data D from the storage unit 14, generates a signal including the measurement data D, and inputs the signal to the transmission unit 12. Upon receiving the signal including the measurement data D, the transmission unit 12 performs ASK modulation on the signal and transmits the signal by radio via the antenna A1 (step S104).

When each first sensor terminal 1 executes the above operation, the measurement data D of each first sensor terminal 1 is transmitted in the first time T1 in a preset order, as shown in FIG. 5, preventing a so-called signal collision in which the information collection terminal 3 is given a plurality of pieces of measurement data D at the same timing. In the above example, the first sensor terminal 1 obtains the measurement data D immediately after being activated. Alternatively, the first sensor terminal 1 may obtain the measurement data D immediately before transmitting the measurement data D or at any timing after receiving the data request DR until transmitting the measurement data D.

Figure 7:
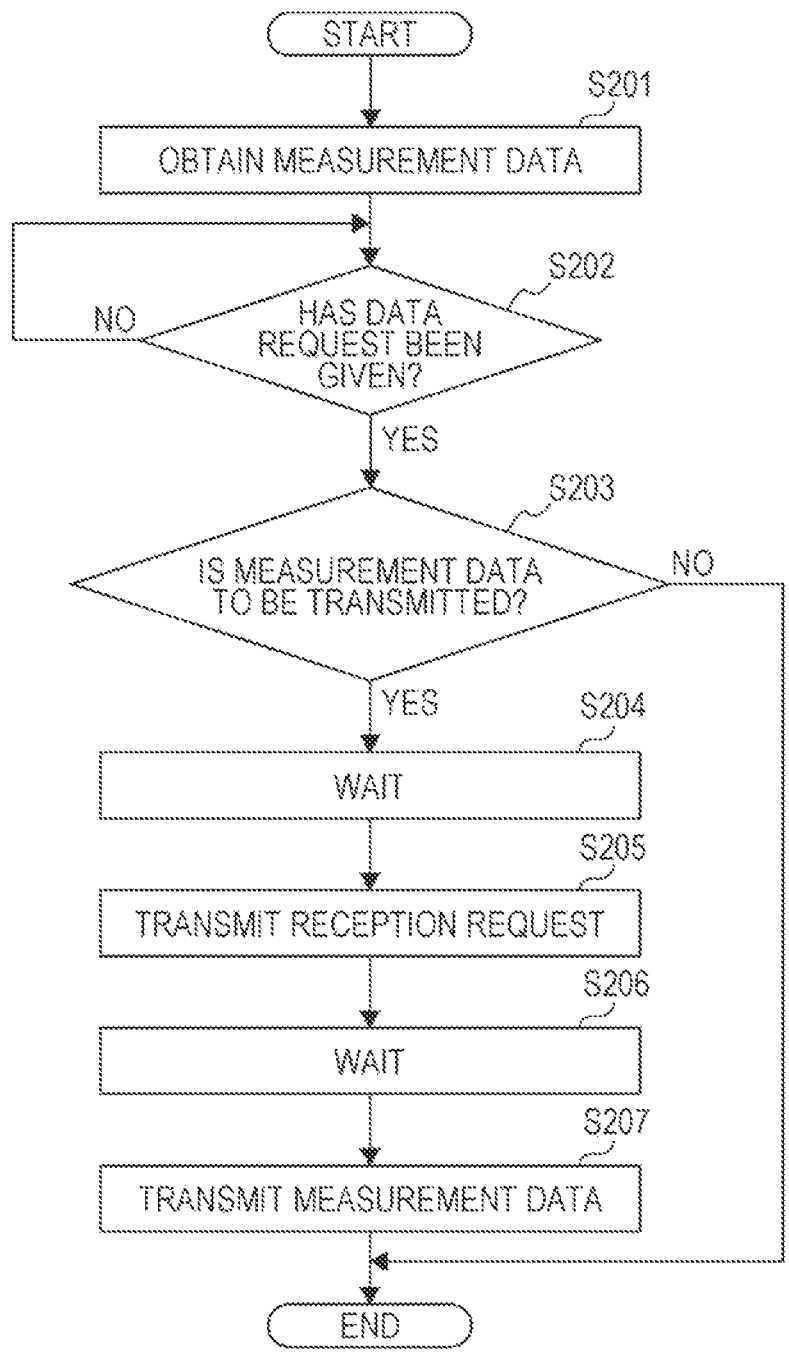
FIG. 7 is a flowchart showing an example of the operation of the second sensor terminal.

FIG. 7 is a flowchart showing an example of the operation of the second sensor terminal 2. The second sensor terminal 2 starts the operation of FIG. 7 when activated by receiving electric power from the information collection terminal 3.

When the second sensor terminal 2 is activated, the sensor 25 obtains measurement data D (step S201) and temporarily stores the measurement data D in the storage unit 24. Thereafter, the receiving unit 23 executes processing of receiving a data request DR from the information collection terminal 3 (step S202), as shown in FIG. 7. The receiving process includes processing for determining whether the received signal includes the information collection terminal ID stored in the storage unit 24. The receiving unit 23 continues the receiving process until receiving the data request DR (step S202: NO).

Upon receiving the data request DR from the information collection terminal 3 via the antenna A2 (step S202: YES), the receiving unit 23 inputs the data request DR to the control unit 21. When the data request DR is input, the control unit 21 reads the measurement data D from the storage unit 24 and determines whether to transmit the measurement data D on the basis of the read measurement data D (step S203).

The control unit 21 determines whether to transmit the measurement data D on the basis of, for example, the measurement data D and range R1 stored in the storage unit 24. The range R1 is the range of the measurement data D preset to determine whether to transmit the measurement data D. In the case a normal value of the measurement data D is set as the range R1, if the measurement data D is within the range R1, the control unit 21 determines not to transmit the measurement data D, and if the measurement data D is outside the range R1, determines to transmit the measurement data D. Thus, the control unit 21 can determine to transmit the measurement data D when the measurement data D is not a normal value, in other words, the measurement data D is an abnormal value. As a result, when the measurement data D is an abnormal value, the second sensor terminal 2 can transmit the measurement data D.

The control unit 21 may determine whether to transmit the measurement data D on the basis of the present measurement data D and past measurement data D stored in the storage unit 24. For example, if the difference between the present measurement data D and the preceding measurement data D is less than a threshold, the control unit 21 determines not to transmit the measurement data D, and if the difference between the present measurement data D and the preceding measurement data D is equal to or greater than the threshold, the control unit 21 determines to transmit the measurement data D. This allows the control unit 21 to determine to transmit the measurement data D when the measurement data D has changed quickly. As a result, the second sensor terminal 2 can transmit the measurement data D when the measurement data D has changed quickly. Instead of the difference between the present measurement data D and the preceding measurement data D, the control unit 21 may determine whether to transmit the measurement data D by comparing the rate of change in the present measurement data D from the past measurement data D with a threshold.

If the control unit 21 determines not to transmit the measurement data D (step S203: NO), the control unit 21 ends the operation. In contrast, if the control unit 21 determines to transmit the measurement data D (step S203: YES), the control unit 21 waits until the first time T1 ends (step S204). The first time T1 may be stored in the storage unit 24.

When the first time T1 ends, and the second time T2 is started, the control unit 21 generates a reception request RR and inputs the reception request RR to the transmission unit 22. When the reception request RR is input, the transmission unit 22 transmits the reception request RR by radio via the antenna A2 (step S205).

When the second time T2 ends, and the third time is started, the control unit 21 reads the order stored in the storage unit 24 and waits until the time corresponding to the order in which the second sensor terminal 2 transmits the measurement data D, in other words, the time to transmit the measurement data D, comes (step S206). The transmission time corresponds to the data request DR reception time plus the time corresponding to the order.

When the measurement data D transmission time has come, the control unit 21 reads the measurement data D from the storage unit 24, generates a signal including the measurement data D, and inputs the signal to the transmission unit 22. Upon receiving the signal including the measurement data D, the transmission unit 22 performs ASK modulation on the signal and transmits the signal by radio via the antenna A2 (step S207).

When each second sensor terminal 2 executes the above operation, the measurement data D of each second sensor terminal 2, which has determined to transmit the measurement data D, is transmitted in the third time T3 in a preset order, as shown in FIG. 5, preventing a so-called signal collision in which the information collection terminal 3 is given a plurality of pieces of measurement data D at the same timing.

The control unit 21 may determine whether to transmit the measurement data D on the basis of the number of times of reception of the data request DR received after the measurement data D is transmitted last. If the reception time is equal to or more than a preset threshold, the control unit 21 may determine to transmit the measurement data D, and if the reception time is less than the preset threshold, the control unit 21 may determine not to transmit the measurement data D.

Alternatively, the control unit 21 may determine whether to transmit the measurement data D on the basis of the time passed after the measurement data D is transmitted last. The control unit 21 may determine to transmit the measurement data D when the elapsed time is equal to or longer than a preset threshold and may determine not to transmit the measurement data D when the elapsed time is less than the preset threshold.

These determination methods allow the control unit 21 to determine to regularly transmit the measurement data D at intervals longer than the measurement data D collection cycle of the first sensor terminal 1. As a result, the second sensor terminal 2 can transmit the measurement data D regularly at intervals longer than the measurement data D collection cycle of the first sensor terminal 1. The control unit 21 may use one of the above determination methods or may use two or more methods in combination.

In the case where the control unit 21 makes the determination on the basis of the measurement data D, the second sensor terminal 2 can obtain the measurement data D and determine whether to transmit the measurement data D at any timing from the time the data request DR is given until the reception request RR is transmitted.

In the case where the control unit 21 makes the determination without using the measurement data D, in other words, using the number of reception times or the elapsed time, the second sensor terminal 2 can determine whether to transmit the measurement data D at any timing after receiving the data request DR until transmitting the reception request RR. In this case, the second sensor terminal 2 may obtain the measurement data D at any timing after receiving the data request DR until transmitting the measurement data D.

Figure 8:
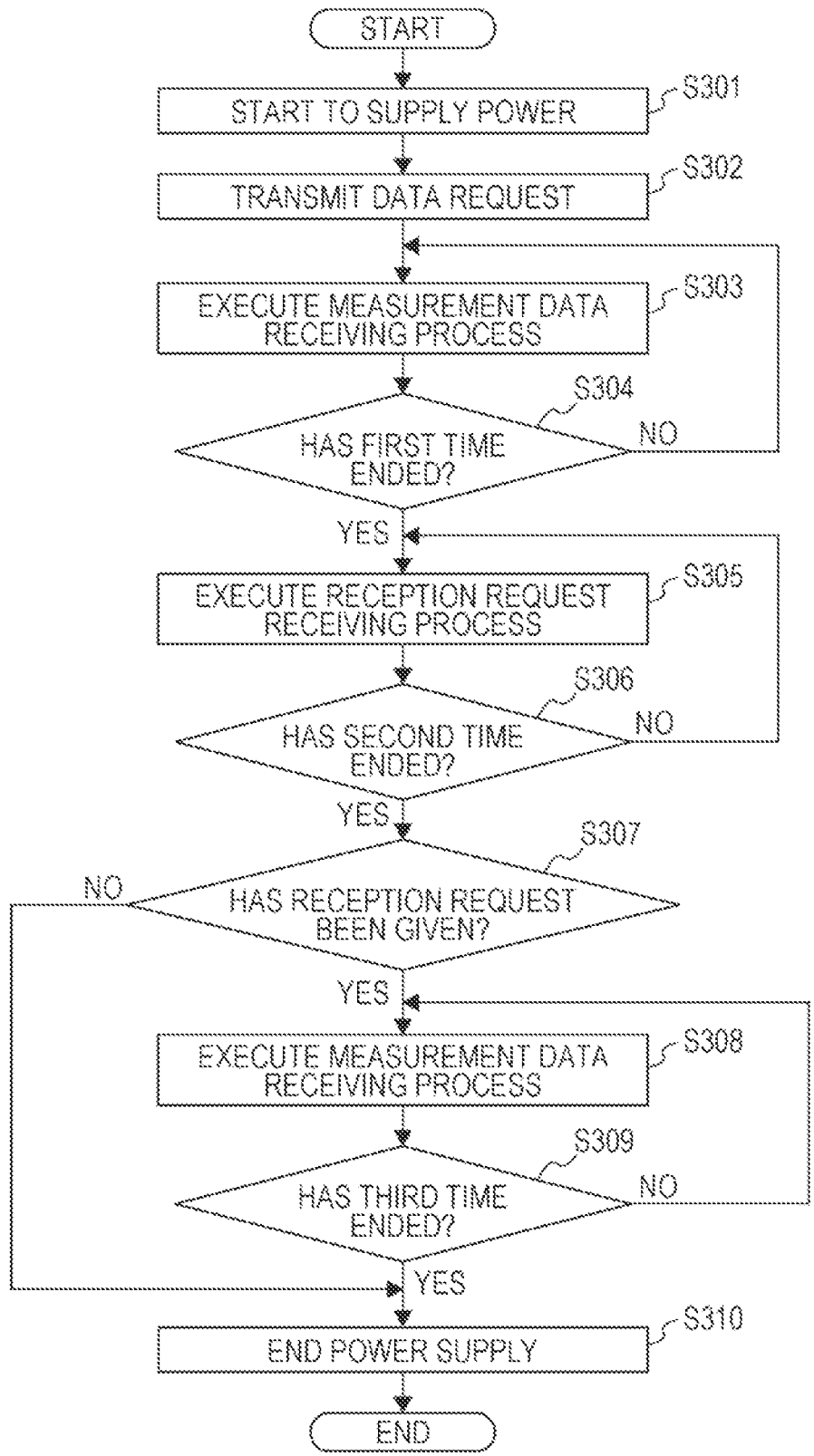
FIG. 8 is a flowchart showing an example of the operation of the information collection terminal.

FIG. 8 is a flowchart showing an example of the operation of the information collection terminal 3. When the time to start the operation time T has come, the information collection terminal 3 starts the operation of FIG. 8.

When the time to start the operation time T has come, the control unit 31 generates an unmodulated signal for supplying electric power and inputs the signal to the transmission unit 32. When the signal is input, the transmission unit 32 transmits the signal by radio via the antenna A3. Thus, power supply from the transmission unit 32 to the sensor terminal group is started (step S301). The first sensor terminal 1 and the second sensor terminal 2 are activated when receiving electric power from the information collection terminal 3, as described above, to start their respective operations in FIGS. 6 and 7 to obtain measurement data D.

The control unit 31 generates a data request DR and inputs the data request DR to the transmission unit 32. Upon receiving the data request DR, the transmission unit 32 transmits the data request DR by radio via the antenna A3 (step S302).

When the transmission of the data request DR ends (when the zeroth period ends), the receiving unit 33 executes processing of receiving the measurement data D from the first sensor terminal 1 (step S303). Thus, the first time T1 is started. Upon receiving a signal including the measurement data D, the receiving unit 33 inputs the signal to the control unit 31. Upon receiving the signal, if the sensor terminal ID included in the signal matches the sensor terminal ID of the first sensor terminal 1 stored in the storage unit 34, the control unit 31 stores the measurement data D included in the signal in the storage unit 34 in association with the sensor terminal ID of the first sensor terminal 1 that has transmitted the measurement data D. The receiving unit 33 continues the receiving process until the first time T1 ends (step S304: NO).

When the first time T1 ends (step S304: YES), and the second time T2 is started, the receiving unit 33 executes processing of receiving a reception request RR from the second sensor terminal 2 (step S305). Upon receiving the reception request RR, the receiving unit 33 inputs the reception request RR to the control unit 31. The receiving unit 33 continues the receiving process until the second time T2 ends (step S306: NO).

When the second time T2 ends (step S306: YES), the control unit 31 determines whether one or more reception requests RR have been input (step S307). In other words, the control unit 31 determines whether the receiving unit 33 has received one or more reception requests RR. If the receiving unit 33 has not received any reception request RR (step S307: NO), the control unit 31 ends the input of the signal for supplying electric power to the transmission unit 32. Thus, the power supply to the sensor terminal group ends (step S310). Thereafter, the control unit 31 ends the operation.

In contrast, if the receiving unit 33 has received one or more reception requests RR (step S307: YES), the receiving unit 33 executes processing of receiving measurement data D from the second sensor terminal 2 (step S308). Thus, the third time T3 is started. Upon receiving a signal including the measurement data D, the receiving unit 33 inputs the signal to the control unit 31. Upon receiving the signal, if the sensor terminal ID included in the signal matches the sensor terminal ID of the second sensor terminal 2 stored in the storage unit 34, the control unit 31 stores the measurement data D included in the signal in the storage unit 34 in association with the sensor terminal ID of the second sensor terminal 2 that has transmitted the measurement data D. The receiving unit 33 continues the receiving process until the third time T3 ends (step S309: NO).

When the third time T3 ends (step S309: YES), the control unit 31 ends the input of the signal for supplying electric power to the transmission unit 32. Thus, the power supply to the sensor terminal group ends (step S310). Thereafter, the control unit 31 ends the operation.

The information collection terminal 3 waits until the time to start the next operation time T comes (until the fourth time T4 passes).

The above operation of the information collection terminal 3 allows the information collection terminal 3 to transmit the data request DR in the zeroth time T0, receive the measurement data D from the first sensor terminal 1 in a preset order in the first time T1, receive the reception request RR from the second sensor terminal 2 in the second time T2, and upon receiving the reception request RR, receive the measurement data D from the second sensor terminal 2 in a preset order in the third time T3, as shown in FIG. 5.

According to this embodiment, the measurement data D of the first sensor terminal 1 is collected every operation time T of the information collection terminal 3, and the measurement data D of the second sensor terminal 2 is collected only when the information collection terminal 3 has received the reception request RR, as described above. Collecting the measurement data D in this manner decreases the measurement data D collection cycle of the first sensor terminal 1 as compared with the measurement data D collection cycle of the second sensor terminal 2.

The user of the information collection system 100 need only set a sensor terminal (for example, a sensor terminal including a strain sensor), which is preferable to collect measurement data D in a relatively short collection cycle, as the first sensor terminal 1 and a sensor terminal (for example, a sensor terminal including an earthquake sensor), which can have a long measurement data D collection cycle, or which need only collect the measurement data D only at a specific timing, as the second sensor terminal 2, and need only set the respective orders to the first sensor terminal 1 and the second sensor terminal 2. This allows for collecting the measurement data D of the former sensor terminals in a short collection cycle and collecting the measurement data D from the latter sensor terminals as necessary.

Figure 9:
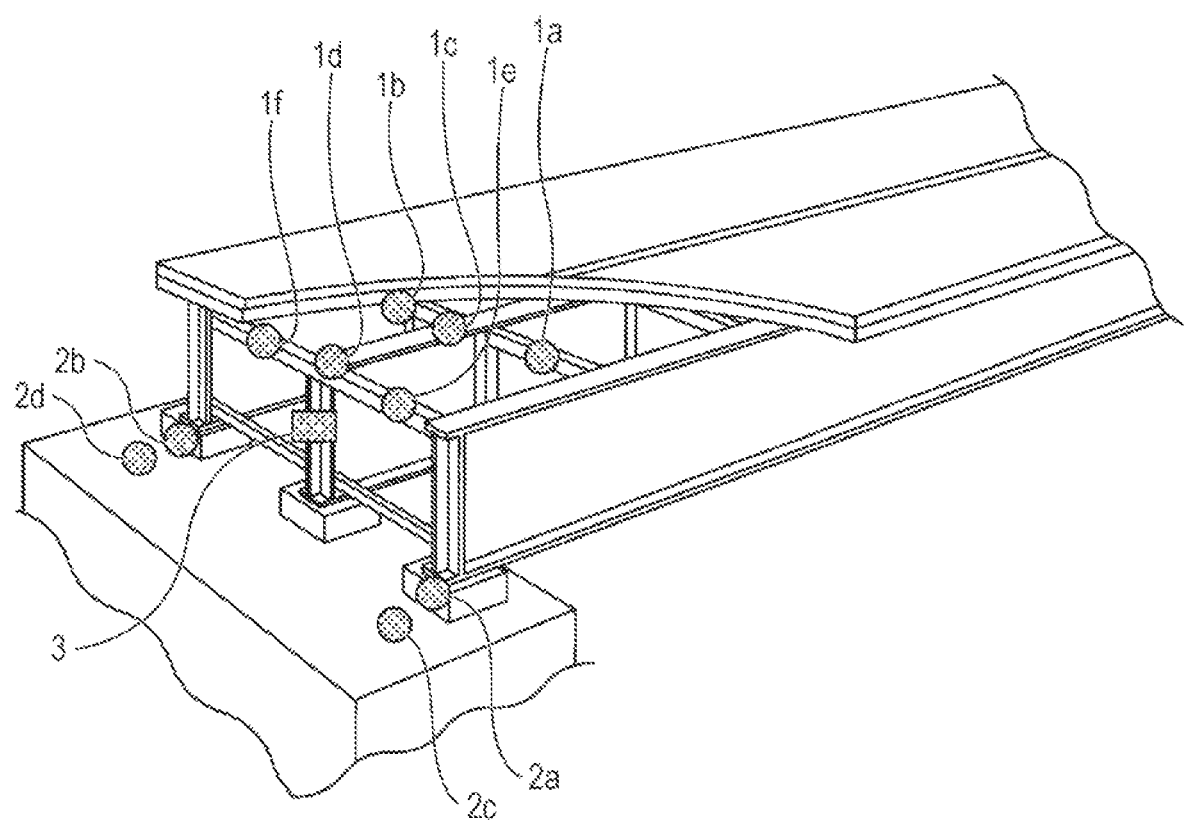
FIG. 9 is a diagram illustrating a specific example of the information collection system.
Figure 10:
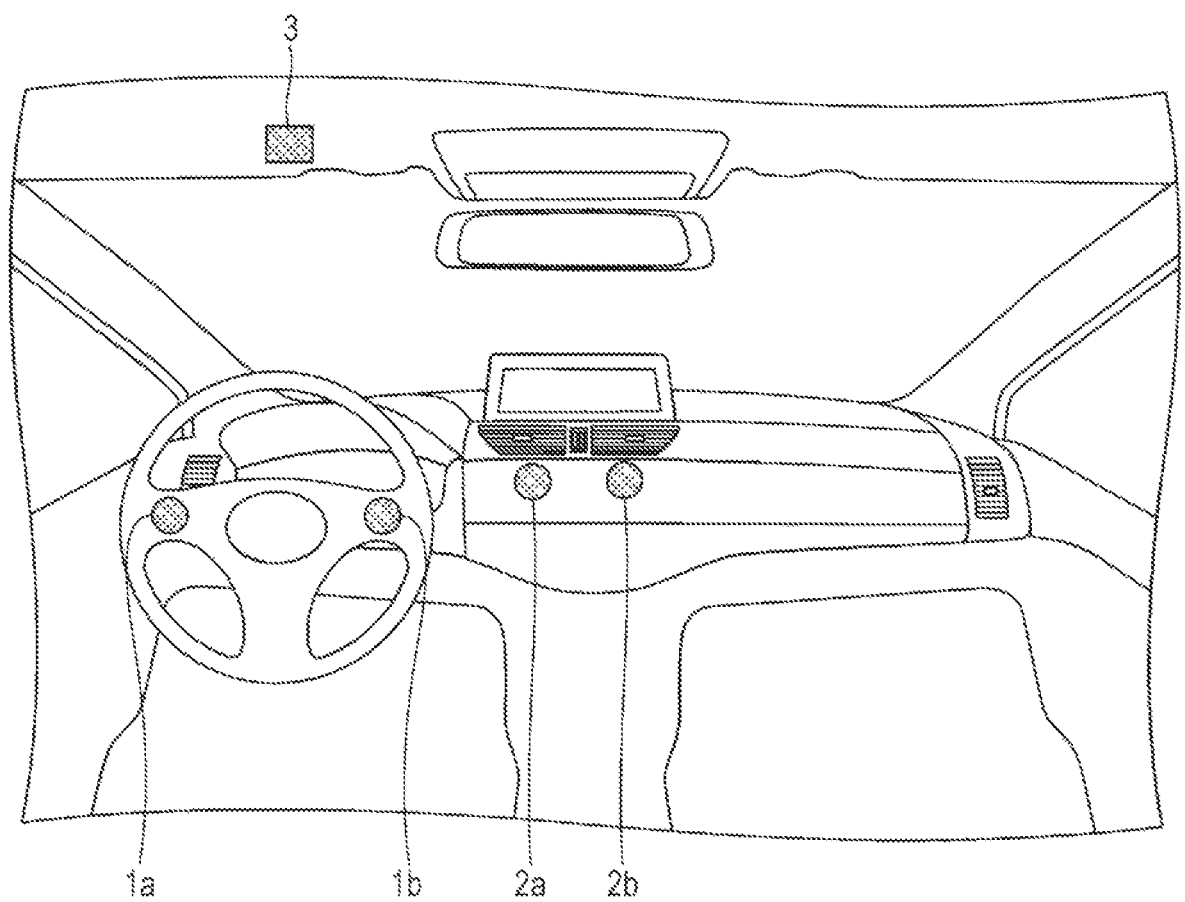
FIG. 10 is a diagram illustrating a specific example of the information collection system.

FIGS. 9 and 10 are diagrams illustrating specific examples of the information collection system 100. In the example of FIG. 9, the information collection system 100 is used in a bridge beam. The sensor terminal group of the information collection system 100 in FIG. 9 includes the first sensor terminals 1a to 1f and the second sensor terminals 2a to 2d disposed at individual portions of the bridge beam.

The first sensor terminals 1a and 1b each include an acceleration sensor, the first sensor terminals 1c and 1d each include a load sensor, and the first sensor terminals 1e and 1f each include a strain sensor. The second sensor terminals 2a and 2b each include an earthquake sensor, and the second sensor terminals 2c and 2d each include a strong-wind sensor. The information collection terminal 3 collects acceleration data from the first sensor terminals 1a and 1b, collects load data from the first sensor terminals 1c and 1d, collects strain data from the first sensor terminals 1e and 1f, collects earthquake data from the second sensor terminals 2a and 2b, and collects strong-wind data from the second sensor terminals 2c and 2d.

This configuration allows the information collection terminal 3 to collect the acceleration data, the load data, and the strain data in a short collection cycle. This allows an external device (for example, a server for monitoring the bridge beam), which has received the measurement data from the information collection terminal 3 via a communication means, to check changes in the shape of the bridge beam and the responsivity of the bridge beam to passing vehicles on the basis of the measurement data and to continuously monitor the safety of the bridge beam.

The information collection terminal 3 can also collect the earthquake data and the strong-wind data at the occurrence of earthquake and strong wind, respectively. This allows the external device to detect the occurrence of a damage to the bridge beam on the basis of the measurement data and to use the detection result in inspection of the bridge beam and determination of passage permission.

The kind of the sensors and the number and installation locations of the sensor terminals used in bridge beams are not limited to the example of FIG. 9. A plurality of information collection systems 100 can also be used in one bridge beam.

In contrast, in the example of FIG. 10, the information collection system 100 is used in a vehicle. The sensor terminal group of the information collection system 100 of FIG. 10 includes the first sensor terminals 1a and 1b and the second sensor terminals 2a and 2b installed in a vehicle compartment.

The first sensor terminals 1a and 1b each include a steering switch, the second sensor terminal 2a includes a temperature sensor, and the second sensor terminal 2b includes a humidity sensor. The information collection terminal 3 collects pressure data of the steering switches from the first sensor terminals 1a and 1b, collects temperature data from the second sensor terminal 2a, and collects humidity data from the second sensor terminal 2b.

This configuration allows the information collection terminal 3 to collect the pressure data of the steering switches in a short collection cycle. This allows an external device (for example, an in-vehicle electronic control unit [ECU]), which has received the measurement data from the information collection terminal 3 via a communication means, to control the vehicle quickly on the basis of the measurement data. In other words, this enhances the responsivity to the operation of the steering switches.

The information collection terminal 3 can also collect temperature data and humidity data when the temperature and the humidity in the vehicle chamber have changed. This allows an external device to obtain changes in the temperature and humidity in the vehicle chamber on the basis of the measurement data to use them in adjusting the temperature and humidity.

The kind of the sensors and the number and installation locations of the sensor terminals used in vehicles are not limited to the example of FIG. 10. A plurality of information collection systems 100 can also be used in one vehicle.

The configuration of the present invention is not limited to the configurations of the above embodiments. The above configurations may be combined with another element. In this respect, the present invention may be changed without departing from the spirit thereof and may be defined as appropriate according to the applications.

What is claimed is:

1. An information collection system comprising:
   a sensor terminal group including a plurality of first sensor terminals and a plurality of second sensor terminals; and
   an information collection terminal capable of wireless communication with the sensor terminal group, wherein
   the information collection terminal includes:
      a first transmission unit configured to transmit data requests to the sensor terminal group; and
      a receiving unit configured, after the data requests are transmitted, to execute processing of receiving first measurement data from the plurality of first sensor terminals in a first period, to execute processing of receiving reception requests from the plurality of second sensor terminals in a second period, and when the reception requests are given in the second period, to execute processing of receiving second measurement data from the plurality of second sensor terminals in a third period, wherein
   each of the plurality of first sensor terminals includes:
      a first sensor configured to obtain the first measurement data; and a second transmission unit configured, when the data requests are given, to transmit the first measurement data in the first period, and wherein each of the plurality of second sensor terminals includes:
- a second sensor configured to obtain the second measurement data;
- a control unit configured to determine whether to transmit the second measurement data; and
- a third transmission unit configured, when the data requests are given, and when the control unit determines to transmit the second measurement data, to transmit the reception requests in the second period and transmit the second measurement data in the third period.

2. The information collection system according to claim 1, wherein the plurality of first sensor terminals transmit the first measurement data in a predetermined order in the first period.

3. The information collection system according to claim 1, wherein the plurality of second sensor terminals transmit the second measurement data in a predetermined order in the third period.

4. The information collection system according to claim 1, wherein the control unit determines whether to transmit the second measurement data based on the second measurement data and a preset range of the second measurement data.

5. The information collection system according to claim 1, wherein the control unit determines whether to transmit the second measurement data based on the second measurement data and past measurement data obtained by the second sensor.

6. The information collection system according to claim 1, wherein the control unit determines whether to transmit the second measurement data based on a number of times of a request of the data requests received after the second measurement data is transmitted last.

7. The information collection system according to claim 1, wherein the control unit determines whether to transmit the second measurement data based on a time passed after the second measurement data is transmitted last.

8. The information collection system according to claim 1, wherein each of the plurality of first sensor terminals and the plurality of second sensor terminals is a radio-frequency identifier (RFID) tag.

9. The information collection system according to claim 1, wherein
the plurality of first sensor terminals transmit the first measurement data at different times in the first period, and wherein
the plurality of second sensor terminals transmit the reception requests at a time in the second period and transmit the second measurement data at different times in the third period.

10. An information collection terminal capable of wireless communication with a sensor terminal group including a plurality of first sensor terminals and a plurality of second sensor terminals, the information collection terminal comprising:
- a transmission unit configured to transmit data requests to the sensor terminal group; and
- a receiving unit configured, after the data requests are transmitted, to execute processing of receiving first measurement data from the plurality of first sensor terminals in a first period, to execute processing of receiving reception requests from the plurality of second sensor terminals in a second period, and when the reception requests are given in the second period, to execute processing of receiving second measurement data from the plurality of second sensor terminals in a third period.

* * * * *